Figure 1:
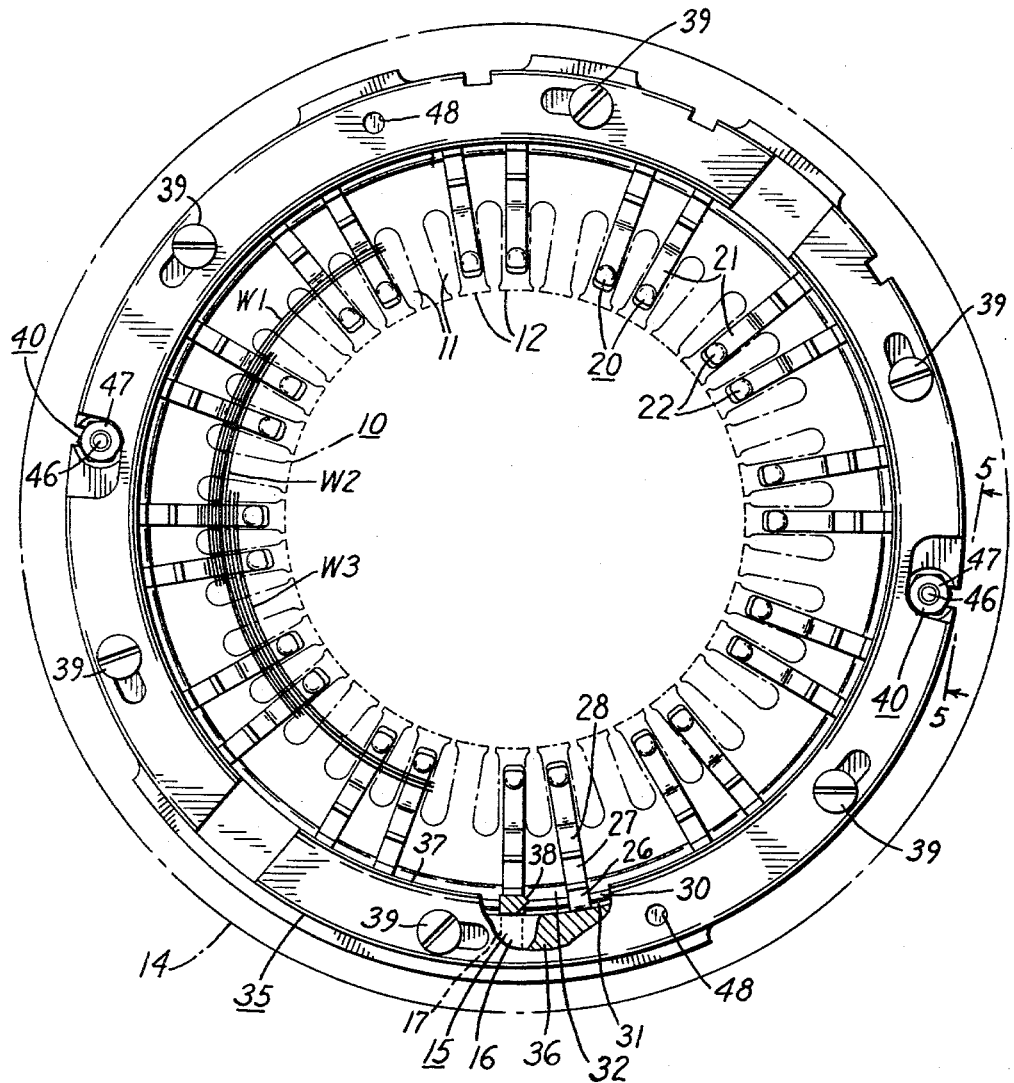

May 18, 1965  R. W. WALLING  3,184,173
STATOR WINDING EQUIPMENT

Filed Jan. 17, 1962  3 Sheets-Sheet 1

INVENTOR.
RICHARD W. WALLING
BY Albert H. Reuther
HIS ATTORNEY

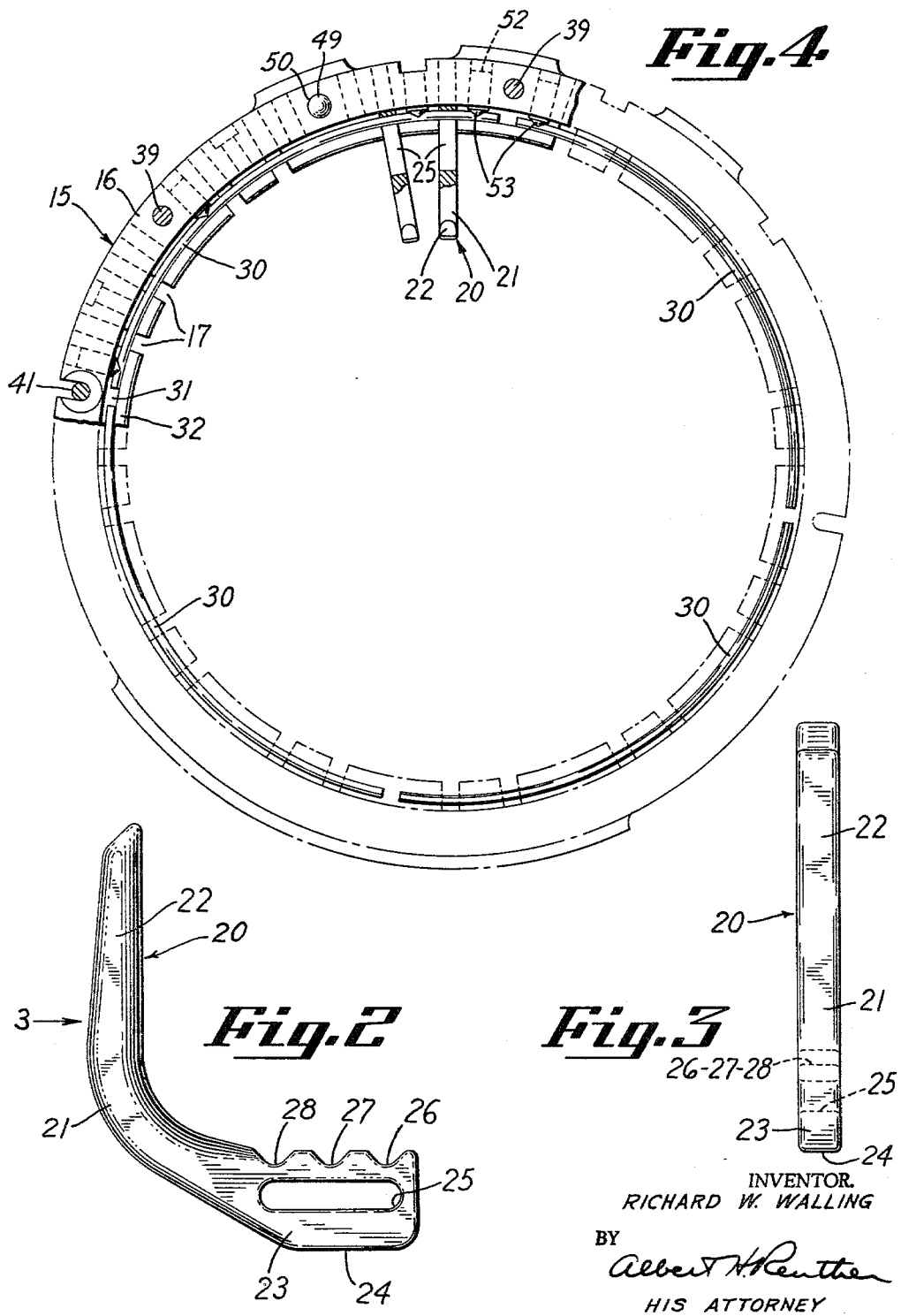

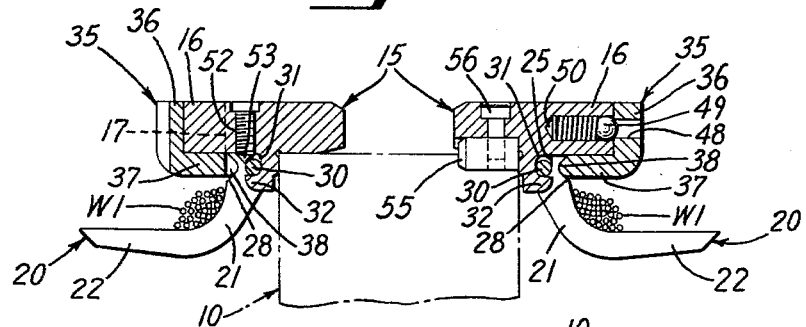
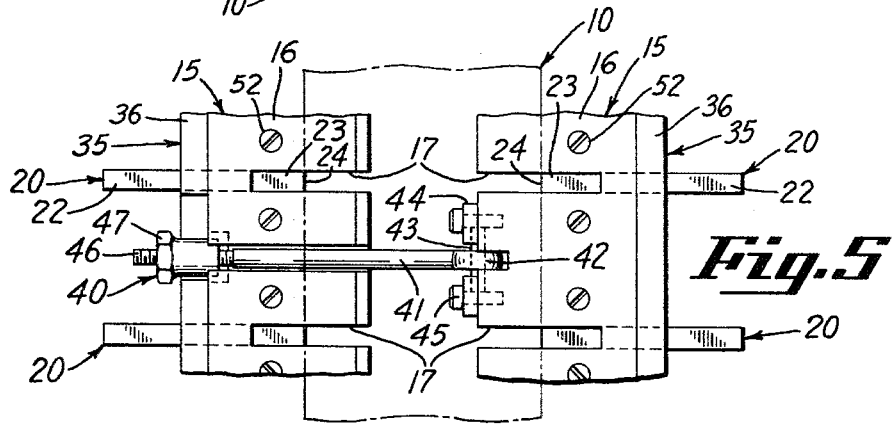
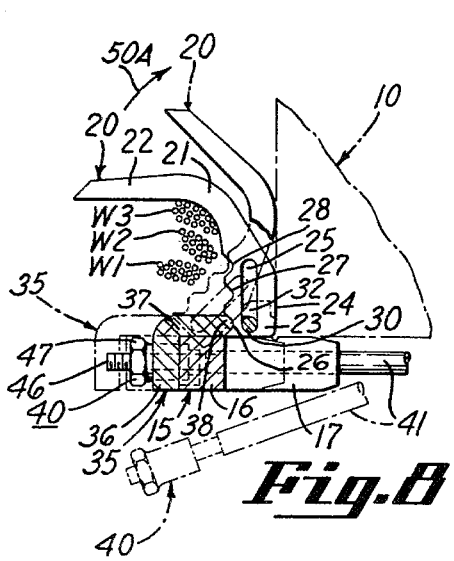
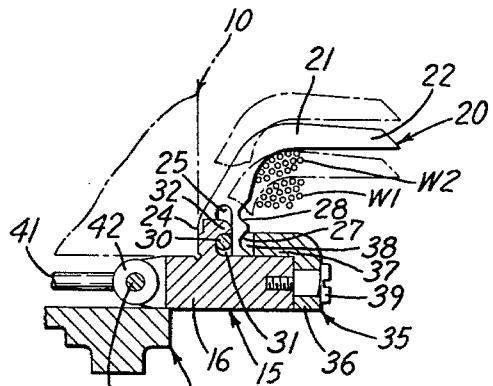

United States Patent Office 3,184,173
Patented May 18, 1965

3,184,173
STATOR WINDING EQUIPMENT
Richard W. Walling, Dayton, Ohio, assignor to General Motors Corporation, Detroit, Mich., a corporation of Delaware
Filed Jan. 17, 1962, Ser. No. 166,853
4 Claims. (Cl. 242—1.1)

This invention relates to equipment for winding stator means of a dynamoelectric machine, and, particularly, to apparatus for efficient placement of multiple layers including end turns of conductors into predetermined locations on a polyphase stator means.

An object of this invention is to provide a new and improved stator conductor placement structure adapted to facilitate formation of polyphase stator winding end turns and to assure compact layering of conducting material including end turns in limited space.

Another object of this invention is to provide stator winding apparatus combined with radially slideable multi-position finger means carried by a stator support means on the winding apparatus and engaged by conductors particularly along end turns during winding operation to assure sufficient spacing for predetermined triple layering of conductors of winding means.

Another object of this invention is to provide on a stator winding apparatus a stator support means fitted with a plurality of generally elbow-shaped finger means each having a slot and several notch-like recesses therein to permit both arcuate and lateral movement thereof in differing adjustable positions maintained for predetermined triple layering of conductors of winding means.

A further object of this invention is to provide a three-position captive-finger stator winding adapter assembled to include a plurality of arcuately as well as laterally movable substantially L-shaped members, each having a radially-located slot therein as well as three external recesses engageable individually by an adjustable retainer means to set lateral positioning of each finger means into progressive triple locations in only one of which the finger means can be arcuately displaced with respect to a guide means complementary to one dimension of the slot of each finger means to assure sufficient spacing for polyphase stator end coil formation.

Another object of this invention is to provide a three-position captive-finger stator winding adapter and fixture means for use with a stator winding apparatus that can effect supplemental guidance in placement of coils of wire in slots of a magnetic core having a plurality of adjacent slots, there being angular support means and adjustable retainer means on each side of the magnetic core as well as a fastening means therebetween for retention thereof on opposite sides of the core, each angular support means having laterally extending openings therein across which guide means can extend transversely thereof to fit through a slot of each of a plurality of movable finger means having such slot complementary thereto in at least one direction, each finger means including a generally L-shaped body portion terminating at a free end around and about which end the wire is wound to a depth location dependent upon positioning of an opposite end of the finger means having a slot to permit linearly sliding movement thereof along the guide means therein as well as three notch-like recesses selectively engageable by the adjustable retainer means.

Further objects and advantages of the present invention will be apparent from the following description, reference being had to the accompanying drawings wherein a preferred embodiment of the present invention is clearly shown.

In the drawings:
FIGURE 1 is an elevational view of structure in accordance with the present invention to facilitate triple layer winding of a stator core.
FIGURE 2 is a detailed side view of a finger means in accordance with the present invention.
FIGURE 3 is an edge view of the finger means taken in the direction of arrow 3 in FIGURE 2.
FIGURE 4 is an elevational view of guide means fitted to support means shown in background therewith.
FIGURE 5 is a fragmentary end assembly view taken in the direction of arrow 5 in FIGURE 1.
FIGURE 6 is a fragmentary cross-sectional view of multi-positioned finger means assembled and stationed in a first position or basic layering.
FIGURE 7 is a fragmentary cross-sectional view of multi-positioned finger means assembled and stationed in a second or intermediate layering position.
FIGURE 8 is a fragmentary cross-sectional view of multi-positioned finger means assembled and stationed in a third or final layering position.

Manufacturers of dynamoelectric machines are encountering increased demand for multi-speed as well as polyphase wound dynamoelectric machine equipment. On a multi-speed machine a stator winding assembly can be fitted with a pair of main windings as well as a phase or auxiliary winding of insulated wire or conducting material which must be positioned into limited space of stator lamination slots. Also, on polyphase machines there can be a total of three main windings each including coil portions which must be positioned in limited space of slots of dynamoelectric machine stator laminations. Stator winding equipment has been devised for mechanically and automatically winding conductors or wires to slots of a magnetic stator core for use on dynamoelectric machines and the like. A copending application Serial Number 69,057—Busch et al., filed November 14, 1960, now Patent 3,072,349—Busch et al., issued January 8, 1963, discloses a winding adapter apparatus which can be used for positioning of dual layers of conductors or wires into slots of a magnetic stator core. Reference can be made to this copending application as well as to a Patent 2,304,520—Wirtz and Rodgers, belonging to the assignee of the present invention, disclosing a winding machine of a type on which the apparatus or multi-position winding adapter can be used. The present invention provides adjustable structure for predetermined triple layering of conductors by such stator winding equipment.

In FIGURE 1 of the drawings, there is shown a dynamoelectric machine stator core generally indicated by numeral 10 having a plurality of slots 11 located radially and separated by teeth 12 in a well-known manner. Each of these slots can be fitted with suitable insulating means such as slot liners so as to separate metal of the teeth 12 from conducting material or wiring identified by references W-1, W-2 as well as W-3 representing first, or basic layering; second, or intermediate layering as well as third, or final layering, respectively, of coils to be fitted into the slots 11 which are limited in space available for physically receiving such triple layering of insulated wiring or conductors. The slotted stator core illustrated in FIGURE 1 can have a predetermined number of radial slots totalling thirty-six, for example, and this stator core is mounted or retained with respect to a winding machine 14 having a work-holder portion on which improved multi-position captive-finger stator winding adapter means for placement of triple layering of wires or conductors can be carried. Stator conductor placement structure generally indicated by numeral 15 in views of FIGURES 1 and 5–8 includes a generally angular support means or portion 16 having laterally extending cutouts or recess-like slots 17 formed therein as can be best seen in the view of FIGURE 5. This support means with the recesses 17 is adapted to receive finger means generally indicated by numeral 20 in the drawings. Each finger means 20 has a substantially L-shaped or elbow-like body portion 21 including a tapered end 22 integral therewith and terminating in a location or position extending substantially axially and longitudinally away from the magnetic stator core 10. Such finger means 20 are provided on each of opposite sides of the stator core 10 and each finger means includes an anchoring end portion 23 also integral with the body portion 21. Each anchoring end portion 23 of the finger means includes a flat side 24 extending substantially parallel to an elongated cutout or slot 25. The flat side 24 is located on a side of the anchoring end portion 23 on a side of the slot 25 opposite to location of cutouts or triple recess-like notches 26, 27 and 28 further in accordance with the present invention. FIGURES 2 and 3 illustrate the finger means in detail and views of FIGURES 1, 6, 7 and 8 also show the finger means in various directions and positions. The anchoring end portion 23 of each finger means 20 is adapted to fit complementary to the cutouts or slot-like recesses 17 in the support means 16 noted earlier. The anchor end portions 23 are substantially complementary to these cutouts or recesses 17 so as to avoid wobble of the finger means when assembled thereto though permitting lateral or radially inwardly and outwardly sliding movement of the anchoring end portions 23 relative to the support means 16.

FIGURE 4 illustrates guide means 30 which can include curved or arcuate segments which fit into complementary grooves 31 provided adjacent to a flange or extension portion 32 provided integrally though intermittently along the angular support means 16 shown as background in the illustration of the guide means 30 in FIGURE 4 and also visible in views of FIGURES 5 through 8. The flange segments or portions 32 are located along a radially inner periphery or side of the support means 16 which engage an outer periphery and sides of the stator core 10 as can be seen in views of FIGURES 6, 7 and 8. The guide means 30 have a wire-like configuration with a width or diameter complementary to the slot 25. The guide means 30 serves as a limit stop for radially inward and outward movement of the anchor end portion 23 of each finger means slideable laterally relative to the cutouts or recesses 17 of the support means 16. Provision of the guide means in at least two segments and as shown, for example, as a segment in each quadrant can facilitate access to finger means for replacement thereof in the event of damage or wear thereto.

An angular retaining means generally indicated by numeral 35 has a body portion with a radially extending segment 36 as well as an axially extending segment 37. The axially extending segment 37 of such a retaining means on each side of the stator core assembly is located along a radially inner periphery of the support means 16 and is adapted to fit telescopically therewith. The axially extending segment 37 terminates at predetermined locations in a rounded abutment 38 selectively engageable with corresponding predetermined notch-like recesses 26–27–28 of the finger means 20. Suitable fastening means such as screws 39 can be provided to maintain assembly of the retaining means 35 telescopically relative to the angular support means 16.

A clamping mechanism generally indicated by numeral 40 can be provided in diagonally opposite locations and can include a stud or pin 41 having an eyelet end 42 journalled relative to a rod or dowel 43 held by a plate 44 and screw means 45 to one of the support means 16 as shown in FIGURE 5. This pivot or journalling structure is also shown in FIGURE 7. A free end of the rod or pin 41 is threaded as indicated at 46 so as to receive a nut 47 thereon for holding pairs of support means and retainer means in assembled relation on opposite sides of the magnetic stator core 10. When the nut 47 is removed from each of the threaded ends it is possible to separate the support and retaining means and also to replace the magnetic stator core 10 for a subsequent winding operation on another stator core.

Proper positioning of the retainer means 35 relative to the support means 16 can be assured by provision of a pair of substantially diametrically oppositely located apertures 48 alignable with spring biased ball means 49 located in cavities 50 in the support means, one of the cavities 50 being shown in the view of FIGURE 6. The view of FIGURE 6 also shows a set screw means 52 which can be provided in predetermined locations along the support means 16 to be threaded therein such that a pointed or conical end 53 of each set screw means 52 can engage the wire-like guide means 30 in each of the quadrants thus assuring retention thereof relative to the flange portion 32 and groove 31 formed therefor. A key means 55 can be retained by a set screw means or through bolt 56 on one of the support means 16 and this key means can fit complementary to the cutout in a stator core so as to assure proper positioning thereof for placement of the various layers of windings or insulated conductors into the slots thereof.

The illustration of FIGURE 6 shows positioning of the finger means 20 such that the anchor end portion thereof has the notch 28 engaged by the end abutment 38 of the retainer means 35. It is to be understood that each of the finger means is so positioned such that a first or basic layering of winding W–1 can be accomplished by operation of the stator winding apparatus. The wiring for the first or basic coil portions W–1 occurs with wire being placed around ends 22 of the finger means subject to formation of end turns for a plurality of coil portions of the first layering.

FIGURE 7 illustrates finger means 20 having notch 27 thereof engaged by abutment end 38 of the retainer means 35 so as to effect intermediate positioning of the guide means 30 relative to the slot 25. In this intermediate positioning further wiring or insulated conductor material can be placed by operation of the stator winding apparatus to form the coil portions W–2 which are located substantially radially adjacent to the initial coil portions W–1. An outline of initial and final positioning of the finger means 20 is provided in the view of FIGURE 7.

FIGURE 8 shows the finger means 20 in a third or final positioning with the notch 26 engaged by the abutment end 38 of the retainer means 35. An arrow 50A in FIGURE 8 represents arcuate movement of finger means 20 only when guide means 30 in slot 25 is in the third or final positioning. This facilitates removal of the finger means 20 from such end turns formed in triple layering in accordance with the present invention.

It is to be understood that the radially extending segment 36 as well as axially extending segment 37 of the angular retaining means can be turned relative to the support means 16 and that such turning can effect a dislocation of the rounded abutment 38 from an interfit or interlock with a particular recess-like notch such as 26, 27 and 28 of the finger means. The rounded abutment 38 is provided at intermittent locations where the axially extending segment 37 terminates in predetermined flat portions which are illustrated in a left-hand portion of the view of FIGURE 6 and in FIGURE 7. When the flat cut-away in between the rounded abutment 38 is in alignment with a finger means notch as a result of turning of the radially extending portion 36 relative to the support means 16, it is possible to shift positioning of the finger means into differing positions for formation of wound coils in differing layers. It is to be noted that the features of the present invention can be used for various types of wound coils including concentric windings though in FIGURE 1 a simple winding has been shown and outlined for purposes of illustration.

When removing the structure of the present invention from a stator core fitted with multiple layers of windings, the support means 16 and angular retaining means stay together as outlined in FIGURE 8. As noted, the blank or cutout portions intermediate the abutment 38 appear in alignment with the finger means upon turning or shifting of the retaining means relative to the support means.

While the embodiments of the present invention as herein disclosed constitute a preferred form, it is to be understood that other forms might be adopted.

What is claimed is as follows:

1. For use on apparatus for winding slotted stator means of a dynamoelectric machine, a stator conductor placement structure, comprising, a stator support means having an interrupted angular groove and a plurality of substantially radially located cutouts therein for each stator side, a plurality of generally elbow-shaped finger means each having an anchor end portion to fit slideably in said cutouts of said support means and each having a slot and several notch-like recesses therein, a guide means carried by said support means in the angular groove in a position to have said guide means extend substantially transversely through the slot of each finger means held thereby to a predetermined range of movement inwardly and outwardly of said radially located cutouts, and a retainer means adapted to fit complementary to each stator support means and having an axially extending flange portion selectively engageable in said notch-like recesses of said finger means to maintain positioning thereof severally during placement of conductors at differing depths in stator means slots.

2. The structure of claim 1 wherein each finger means has a free end extending axially away from the slotted stator means and there are three recesses in said anchor end portion which is linearly slideable radially inwardly and outwardly in said radially located cutouts of said support means and which can be moved axially away from the slotted stator means during simultaneous shifting of said free end arcuately for removal from end turns of conductors only from one position of interlock of said retainer means and finger means, and a releasable fastening means for assembly and disassembly of pairs of support and retainer means on opposite sides of a slotted stator means.

3. A three-position captive-finger stator winding adapter assembly, comprising, an angular support means having an interrupted axial flange portion adjacent to an interrupted angular groove and a plurality of radially extending cutouts therein for each side of a slotted stator core, at least a pair of curved wire-like guide means placed into the groove of each angular support means, plural elbow-shaped finger means having anchor end portions to fit the cutouts and each having an elongated slot therein through which said wire-like guide means extend substantially transversely cooperable with each other in a predetermined range of laterally inward and outward positioning of said finger means in locations adjacent to the stator core in one of which locations said angular support means and anchor end portions can be shifted axially away from the slotted stator core with a simultaneous predetermined arcuate movement of said finger means, each said anchor end portion also including triple recess-like notches, and a retainer means including an axial flange portion to fit substantially concentrically and telescopically inside said support means and having an end abutment selectively engageable in one of said notches for differing levels of placement of stator conducting material in three successive positively-determined radially-located levels regardless of physically tight space available in the slotted stator core.

4. A stator conductor placement structure that facilitates formation of polyphase stator winding end turns and assures compact layering of conducting material including end turns in differing levels regardless of limited space, comprising angular stator support means to fit axially adjacent to each of opposite sides of a stator core having slots defined by a plurality of teeth, plural finger means carried by said support means, said support means having radially extending cutouts receiving said finger means for radial sliding movement between a plurality of predetermined positions, adjustable retainer means supplementary and placed complementary to said support means to engage said finger means in said predetermined positions to maintain said finger means in any one of said positions, said finger means including an anchor end having an elongated slot therein and notch-like recesses along a side thereof remote from said stator core, and means extending through the slot of each of said finger members to limit their radial movement, said retainer means having flange means integral with said finger recesses to position said finger means for efficient basic, intermediate and final layering of conducting material into stator slots at differing levels radially in the slotted stator core, the engagement of said flange means in one of said recesses providing limited arcuate movement of said finger means relative to said support means upon relative axial movement between said stator core and said support means.

References Cited by the Examiner

UNITED STATES PATENTS

| | | | |
|---|---|---|---|
| 2,304,520 | 12/42 | Wirtz et al. | 242—1.1 |
| 2,998,937 | 9/61 | Potter et al. | 242—1.1 |
| 3,072,349 | 1/63 | Busch et al. | 242—1.1 |

FOREIGN PATENTS

| | | |
|---|---|---|
| 1,024,157 | 2/58 | Germany. |
| 862,555 | 3/61 | Great Britain. |

MERVIN STEIN, *Primary Examiner.*

HARRISON R. MOSELEY, *Examiner.*